United States Patent Office 2,780,643

Patented Feb. 5, 1957

1

2,780,643

PRODUCTION OF WATER-CLEAR PHTHALIC ACID ESTERS FROM ALCOHOLS

Karl Büchner, Duisburg-Hamborn, Germany, assignor to Ruhrchemie Aktiengesellschaft, Oberhausen-Holten, Germany, a corporation of Germany

No Drawing. Application July 24, 1951, Serial No. 238,389

Claims priority, application Germany August 5, 1950

5 Claims. (Cl. 260—475)

This invention relates to the production of water-clear phthalic acid esters from alcohol. It more particularly relates to a method of preparing water-clear phthalates from synthetic alcohol.

Phthalates of aliphatic alcohols are used to a comparatively large extent as softeners for plastic and similar substances. If these phthalates are to be used as softeners for clear light-colored plastics they must be entirely water-clear themselves. In the preparation of phthalates from synthetic alcohol such as alcohols formed by catalytic carbon monoxide hydrogenation, there are generally obtained only phthalates having a dark color which cannot be used as softeners for light plastic.

Attempts have been made to obtain water-clear phthalates from synthetic alcohols by subjecting these alcohols to hydrogenation under more stringent and carefully controlled conditions. Even, however, with alcohols formed by this careful hydrogenation, no satisfactory lightening of the color of the phthalates could be obtained.

One object of this invention is to obtain waterclear phthalates from synthetic alcohol. This, and still further objects, will become apparent from the following description.

It has now been found, according to the invention, that even synthetic alcohols will react with phthalic acid to form water-clear esters if the synthetic alcohols are subjected to hydrated hydrogenation prior to their esterification. The hydrogenation, according to the invention, is carried out in such a manner that both the olefinic and aldehyde impurities present are decomposed. Such impurities frequently contain aldehydes or unsaturated alcohols in the form of ester or ether bonds.

The hydrated hydrogenation, when carried out in accordance with the invention, causes a decomposition of the ester and ether compounds present without causing any appreciable conversion of the alcohols as, for example, hydrogenation into hydrocarbons. By maintaining suitable operating conditions, the acetals present as impurities in the alcohols can be decomposed by the absorption of water and, at the same time, the aldehydes which are split off can be converted into alcohols and the esters saponified with water without the use of alkali. The small amount of acid produced by the ester decomposition is preferably removed by washing with dilute caustic soda or potash solution. In addition, the alcohol which has been purified in this manner can be again distilled.

The hydrating hydrogenation of the alcohol to be treated is preferably carried out between 200 and 210° C., preferably above 160° C. A temperature higher than 230° C. is detrimental since then a hydrogenation into saturated hydrocarbons will occur in a considerable extent.

The hydrogenation according to the invention may be carried out at normal atmospheric pressure or at any elevated pressure. Most suitable is a pressure lying between 30 and 50 kgs./cm.$^2$.

2

The hydrated hydrogenation may be effected in the presence of any known hydrogenation catalysts. For example, mixtures containing metallic nickel, metallic cobalt or metallic palladium in addition to activators and carrier materials may be used as catalysts. Also catalysts which contain molybdenum sulfide, tungsten sulfide or chromium oxide and copper are suitable for the process according to the invention. It is also of advantage to use catalysts which consist of Raney nickel.

Nickel catalysts which have been activated with magnesium and precipitated on kieselguhr have been found particularly effective. It is of advantage to add water to the synthetic alcohol in a ratio of about 1:6 prior to the hydrating hydrogenation. Thus, for example, a synthetic $C_{10}$ alcohol, to which water was added in the ratio of 1:6, could be purified at 210° C. in accordance with the invention, by a hydrogen treatment carried out at a high pressure to such an extent that after washing with a 5% aqueous caustic soda solution, it no longer showed any characteristics other than a hydroxyl number of 349. Theoretically, one mol of water for each mol of acetal is to be charged into the process. Practically, the quantity of water to be added depends on the content of acetals present in the alcohols to be purified. If the content of acetals is low a small quantity of water is sufficient whereas more water is to be added at a higher content of acetals. In general, 10 percent by weight of water are added to the alcohols to be purified.

The subsequent treatment with caustic soda is necessary in order to eliminate acids formed by decomposition of the acetals present as impurities. When the purified redistilled alcohol was treated with phthalic anhydride with the addition of 0.2% p-toluene-sulfonic acid, there was obtained a water-clear phthalate which could be used as a softener for very light plastics. In the esterification of the synthetic $C_{10}$ alcohol, toluene was used as an azeotropic agent for the separation of the water produced.

*Example 1*

From the products of catalytic carbon monoxide hydrogenation giving adequate quantities of oxygen-containing compounds, there was separated an alcohol which consisted almost exclusively of pure $C_{10}$ alcohol. The alcohol was diluted with 16 percent by volume of water, and 10 percent of a reduced nickel-magnesia-kieselguhr catalyst was added to it. The reaction mixture was thereupon introduced into an autoclave and treated with hydrogen at a pressure of 30 to 50 kgs./cm.$^2$ for 8 hours at 210° C. with constant agitation.

The synthetic alcohol used had the following characteristics:

| | |
|---|---|
| Neutralization number | 0.1 |
| Ester number | 0.6 |
| Hydroxyl number | 337 |
| Iodine number | 1 |
| Carbonyl number | 4 |
| Density, $d_{20}$ | 0.833 |
| Refractive index, $n_D/20$ | 1.4358 |

After the treatment in accordance with the present invention, the purified alcohol had the following characteristics:

| | |
|---|---|
| Neutralization number | 0 |
| Ester number | 0 |
| Hydroxyl number | 349 |
| Iodine number | 0 |
| Carbonyl number | 0 |
| Density, $d_{20}$ | 0.833 |
| Refractive index, $n_D/^{20}$ | 1.4348 |

900 grams of this alcohol were boiled for 3 hours with 420 grams of phthalic anhydride, 3 grams p-toluene-sulfonic acid and 300 cc. pure toluene under a reflux condenser. The alcohol (5.46 mols) was used in an excess of 10% referred to the phthalic anhydride (2.5 mols). After the separation of water had terminated, the reaction product was washed with water containing 1% NaOH, in order to wash out the catalyst. The slightly emulsified liquid obtained thereby was separated by distillation from the toluene and water contained in it. 1150 grams of a completely water-clear didecyl phthalate having the following characteristics was obtained:

| | |
|---|---|
| Molecular weight | 449 |
| Neutralization number | 0 |
| Ester number | 248 |
| Hydroxyl number | 0 |
| Iodine number | 0 |
| Carbonyl number | 0 |
| Density, $d_{20}$ | 0.960 |
| Refractive index, $n_D/^{20}$ | 1.4822 |

This phthalate was an excellent softener for light-colored plastics. When the $C_{10}$ alcohol obtained by catalytic carbon monoxide hydrogenation without the prior treatment in accordance with the invention was esterified with phthalic acid, there was obtained only a dark brown ester unsuited for use as softener for light-colored plastics.

*Example 2*

1000 cm.$^3$ of an amyl alcohol with the following characteristics:

| | |
|---|---|
| Neutralization number | 0 |
| Ester number | 0.3 |
| Hydroxyl number | 612 |
| Iodine number | 0.7 |
| Carbonyl number | 3 |
| Density, $d_{20}$ | 0.819 |

were diluted with 100 cc. of water and 20 g. Raney nickel added to it. The mixture was treated with hydrogen at a pressure of 30 kgs./cm.$^2$ for 8 hours at 210° C. with constant agitation. The amyl alcohol was thereupon separated from the water and the added Raney nickel.

344 grams of the amyl alcohol purified in this way were boiled for approximately 3 hours with 249 grams of phthalic anhydride, 100 cc. of toluene and 3 grams of p-toluene-sulfonic acid under a reflux condenser. Hereby 35 cc. of water condensed. Then the toluene and the excess amyl alcohol were distilled off. The remaining ester was washed two times with an equal volume of 0.4% caustic soda solution and three times with an equal volume of hot water.

500 cc. of a completely water-clear phthalic acid diamyl ester having the following characteristics were obtained:

| | |
|---|---|
| Neutralization number | 0 |
| Ester number | 366 |
| Hydroxyl number | 0 |
| Iodine number | 0 |
| Carbonyl number | 0 |
| Density, $d_{20}$ | 1.021 |

The above examples are given by way of illustration and in no way are intended to limit the invention which is limited by the appended claims or their equivalents.

I claim:

1. Method for the preparation of water-clear phthalate plasticisers from synthetic alcohols obtained from the catalytic hydrogenation of carbon monoxide containing impurities, including olefins, aldehydes and esters, which comprises subjecting such a synthetic alcohol to a hydrogenation in the presence of a hydrogenation catalyst and water at a temperature of about 160–230° C. for the hydrogenation of the impurities, thereafter esterifying the synthetic alcohol with phthalic acid, and recovering a water-clear phthalate.

2. Method according to claim 1, in which said hydrogenation is effected for a period of time, sufficient to split all the esters present.

3. Method according to claim 1, in which said hydrogenation is effected at hydrogen pressures of about 30 to 50 kg. per square centimeter.

4. Method according to claim 1, in which said hydrogenation catalyst is the nickel and magnesium-oxide-containing catalyst.

5. Method according to claim 1, in which said water is present in the ratio of about 1:6.

References Cited in the file of this patent

UNITED STATES PATENTS

| | | |
|---|---|---|
| 1,646,128 | Schaack | Oct. 18, 1927 |
| 1,706,639 | Schaack et al. | Mar. 26, 1929 |
| 1,993,736 | Graves et al. | Mar. 12, 1935 |
| 2,043,688 | Woodhouse | June 9, 1936 |
| 2,569,671 | Hughes et al. | Oct. 2, 1951 |
| 2,612,515 | Hudson et al. | Sept. 30, 1952 |
| 2,614,128 | Mertzweiller | Oct. 14, 1952 |